United States Patent [19]
Robert

[11] Patent Number: 5,526,838
[45] Date of Patent: Jun. 18, 1996

[54] METHOD AND VALVE ASSEMBLY FOR CONTROLLING A PILOT SIGNAL

[75] Inventor: Michael E. Robert, Farmington Hills, Mich.

[73] Assignee: Mac Valves, Inc., Wixom, Mich.

[21] Appl. No.: 371,769

[22] Filed: Jan. 12, 1995

[51] Int. Cl.$^6$ .................................. G05D 16/20
[52] U.S. Cl. .................... 137/12; 137/85; 137/487.5
[58] Field of Search ............................ 137/12, 84, 85, 137/86, 487.5, 488, 492.5

[56] References Cited

U.S. PATENT DOCUMENTS

| | | |
|---|---|---|
| 4,244,396 | 1/1981 | Friedland et al. . |
| 4,253,480 | 3/1981 | Kessel et al. . |
| 4,481,967 | 11/1984 | Frick ......................... 137/85 |
| 4,527,583 | 7/1985 | Simpson . |
| 4,630,631 | 12/1986 | Barnes . |
| 4,635,682 | 1/1987 | Walters . |
| 4,724,865 | 2/1988 | Hirano et al. . |
| 4,877,051 | 10/1989 | Day . |
| 4,887,636 | 12/1989 | Rothen . |
| 4,898,200 | 2/1990 | Odajima et al. . |
| 4,901,758 | 2/1990 | Cook et al. . |
| 5,253,669 | 10/1993 | Gray . |
| 5,325,884 | 7/1994 | Mirel et al. . |

*Primary Examiner*—Robert G. Nilson
*Attorney, Agent, or Firm*—Bliss McGlynn

[57] ABSTRACT

A pilot signal control assembly (10) controls the pilot signal of a valve (18) which is connected to regulator, typically a booster regulator (12). The valve (18) receives air from an air supply (14) and, pursuant to an error signal (E(t)), defined as the command signal (C(t)) less a modified feedback signal (F(t)), modifies its output, the pilot pressure signal. The booster regulator (12) receives the pilot pressure signal and modifies its output ($P_o(t)$) accordingly. A feedback loop (24) transforms the output pressure ($P_o(t)$) into a voltage signal. The voltage signal is multiplied by a proportional factor (A) based on the size of the booster regulator (12). In a signal subloop (30) of the feedback loop (24), the first derivative is taken of the voltage signal. The multiplied signal and the first derivative are added to create the feedback signal (F(t)) which is eventually subtracted from the command signal (C(t)) to create the error signal (E(t)). The first derivative portion of the feedback signal (F(t)) rapidly approaches zero as the output pressure ($P_o(t)$) of the booster regulator (12) gradually approaches the targeted pressure.

8 Claims, 2 Drawing Sheets

METHOD AND VALVE ASSEMBLY FOR CONTROLLING A PILOT SIGNAL

BACKGROUND OF THE INVENTION

1. Field of the Invention

The invention relates to a method and apparatus for fluid handling. More specifically, the invention relates to a method and apparatus for controlling fluid flow via pressure regulation.

2. Description of the Related Art

Electro-pneumatic control valves are commonly employed to monitor and control pressure output of mechanical booster regulators. The regulators, in turn, operate pneumatic equipment such as welding guns. In the prior art, these control valves generally include a pair of solenoid operated popper valves which open and close in response to the signals from control circuitry to maintain a predetermined pilot pressure as dictated by command voltages selected by the operator. An electro-pneumatic transducer in a feedback loop is generally employed to control the pilot pressure output of the control valves.

Control valves known in the prior art and commercially available today are able to produce very precise pilot pressure, approximately 0.2 PSI of the command pressure. While the pilot pressure of the prior art control valves are precisely monitored, problems exist with the control of the pressure output from the mechanical regulators. Despite the precision of the control valves, the regulators can drift up to 5 psi from their target pressure. These conditions of such extreme drift are unacceptable with todays quality control standards.

To combat this problems, a feedback loop has been employed wherein a transducer is used to monitor the output of the regulator. However, this additional feedback causes other problems. First, with this configuration, the control valve and its control circuitry must include parameters which account for the dynamics of both the solenoid operated valves and the valve in pressure of the mechanical regulator. Typically, the regulator output pressure either over or undershoots the target pressure which causes the control valve to "hunt" for its target. The solenoid operated valves thus open and close in rapid succession causing undue wear, premature failure, pressure instability and emit a noise commonly referred to as "motorboating." Additional feedback lines and additional transducers are typically used to correct this problem. However, they are expensive and can impermissibly raise the cost of the control valves to the point when they become uncompetitive. A description of a variation of a feedback system including two feedback lines is found in applicant's co-pending application Ser. No. 08/371, 766, filed Jan. 12, 1995.

SUMMARY OF THE INVENTION

A pilot signal control assembly controls an output pressure of a booster regulator. The booster regulator is used to regulate the pressure of a fluid supply at an output port. The pilot signal control assembly comprises a valve in fluid communication with the fluid supply and the booster regulator. The valve receives fluid from the fluid supply to produce a pilot pressure signal to control the booster regulator. The valve further includes an electrical port. A feedback loop is in fluid communication with the output port of the booster regulator and the electrical port of the valve. The feedback loop includes a transducer in fluid communication with the output port. The transducer transforms energy received from the output pressure into an electrical feedback signal. The feedback signal is subtracted from the command signal to create an error signal received by the electrical port. The pilot signal control assembly is characterized by the feedback loop further including a signal subloop electrically connected between the transducer and the electrical port.

The advantages associated with the invention include implementing a simple cost effective method of precisely and stably controlling the output pressure of a booster regulator. By simply modifying the feedback signal by adding a derivative of the feedback signal thereto, the valve prematurely slows the increase of output pressure by the booster regulator preventing the valve from overshooting its target to the point of creating an underdampened system to prevent the instabilities which are manifest in the "motorboating" phenomenon.

BRIEF DESCRIPTION OF THE DRAWINGS

Other features and advantages of the present invention will be readily appreciated as the same becomes better understood after reading the subsequent description when considered in connection with the accompanying drawings, wherein:

FIG. 3b is a graphic representation of the first derivative of the pressure shown in FIG. 3a.

DETAILED DESCRIPTION OF THE DRAWINGS

Figure 1:
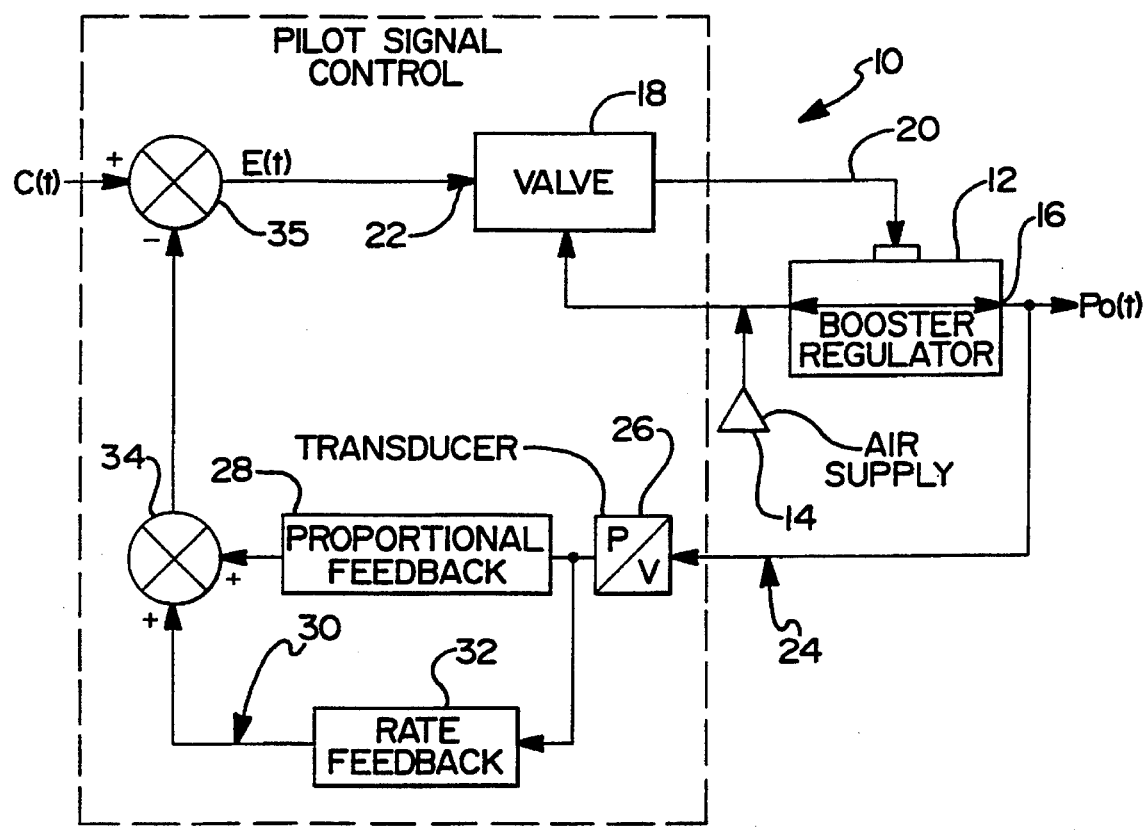
FIG. 1 is a block diagram of the preferred embodiment of the subject invention.

Turning to FIG. 1, a pilot signal control assembly is generally indicated at 10. The pilot signal control assembly 10 controls an output pressure $P_o(t)$ of a booster regulator 12 which is used to regulate the pressure of a fluid supply 14 at an output port 16.

The pilot signal control assembly 10 comprises a valve 18 in fluid communication with the fluid supply 14 and the booster regulator 12. Although the valve 18 may be any valve suitable for use with the pilot signal control assembly 10, the preferred embodiment of the valve 18 is a poppet valve similar to the poppet valve disclosed in U.S. Pat. No. 5,092,365, issued to Neff on Mar. 3, 1992 and assigned to the assignee of the subject invention. This patent is hereby expressly incorporated by reference.

The valve 18 receives fluid from the fluid supply 14, an air supply in the preferred embodiment, to produce a pilot pressure through a pilot pressure line 20. The pilot pressure is a signal and is used to control the booster regulator 12. The valve 18 further includes an electrical port 22 used to receive an error signal $E(t)$, discussed in greater detail below.

A feedback loop, generally shown at 24, is in fluid communication with the output port 16 of the booster regulator 12 and electrically connected to the electrical port 22 of the valve 18. The feedback loop 24 includes a transducer 26 which is in direct fluid communication with the output port 16. The transducer 26 is a pressure voltage transducer and transforms energy received from the output port 16 in the form of fluid pressure into a voltage signal $V(t)$ which will subsequently be transformed into a feedback signal F(t). The feedback loop 24 includes a proportional feedback circuit 28 which modifies the voltage signal V(t) according to the following equation:

$$G(t) = A * V(t) \quad (1)$$

wherein the proportional factor A is a factor representing the calibration of the booster regulator 12. The proportional factor A will change dependant upon the calibration of the booster regulator 12 to which the pilot signal control assembly 10 is attached.

The pilot signal control assembly 10 is characterized by the feedback loop 24 further including a signal subloop, generally shown at 30, which is electrically connected between the transducer 26 and the electrical port 22 of the valve 18. The signal subloop 30 includes a rating circuit 32 which receives the voltage signal V(t) and produces a rated feedback signal R(t) pursuant to the following equation:

$$R(t) = B \frac{dv(t)}{dt} \quad (2)$$

wherein B is a responsiveness factor having a unit of time and is based on the responsiveness of the booster regulator 12. Therefore, B can be programmed to be larger or smaller depending on whether the booster regulator 12 has a quick response time or not.

The feedback loop 24 further includes an adding circuit 34 which adds the voltage signal V(t) and the rated feedback signal R(t) to create a feedback signal F(t) pursuant to the following equation:

$$F(t) = G(t) + R(t) \quad (3)$$

Once the final feedback signal F (t) is calculated by the adding circuit 39 it is inverted and added to a command signal C(t) using a subtraction circuit 35. An error signal E(t) is the output of the subtraction circuit 35 and is used to control the valve 18 and thereby command the booster regulator 12 as it supplies the output pressure, $P_o(t)$, pursuant to the following equation:

$$E(t) = C(t) - F(t) \quad (4)$$

The resulting error signal E(t) is the signal which is sent to the electrical port 22 of the valve 18 from which the valve 18 modifies the pilot pressure signal to the booster regulator 12.

Using the assembly 10 as described above, the operation for controlling the output pressure of the booster regulator 12 includes the steps of: sending an error signal to the valve 18; opening the valve 18 to create a pilot pressure through the pilot pressure line 20 based on the error signal; opening the booster regulator 12 based on the fluid received having the characteristic pilot pressure from the valve 18 to create an output flow defining an output pressure $P_o(t)$; transforming the energy from the output pressure into a voltage signal; creating a rated feedback signal from the voltage signal; adding the voltage signal to the rated feedback signal to create a feedback signal; and subtracting the feedback signal from a command signal to define the error signal. The rated feedback signal is defined as the first derivative of the voltage signal. In this way, when the voltage signal reaches a plateau or steady state, the rated feedback signal will drop to zero because the first derivative of a steady state function is zero.

The voltage signal is multiplied by a proportional factor A prior to the step of adding the voltage signal to the rated feedback signal. Also, prior to the step of adding the voltage signal to the rated feedback signal, the rated feedback signal is multiplied by a responsiveness factor B.

Figure 2:
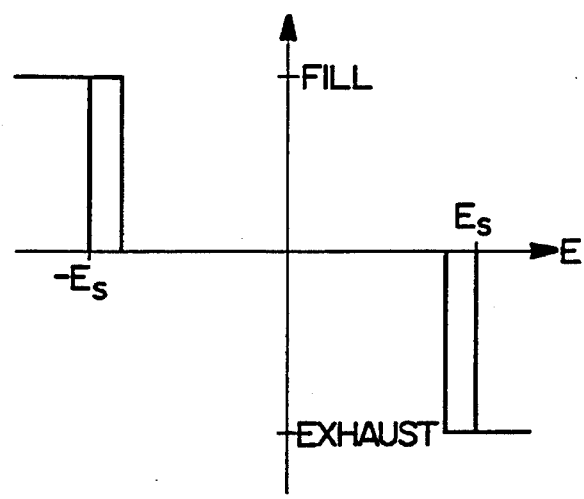
FIG. 2 is a graphic representation of the pilot pressure signal as a function of the error signal.

Turning to FIG. 2, a graph is shown to represent the action or state of the valve 18 as a function of the value of the error signal. More specifically, the Y-axis represents the command for the valve 18 to fill or exhaust the pilot pressure line 20. Therefore, if the error signal produces a negative signal larger than the threshold $-E_s$, the valve 18 will increase the pressure in the pilot pressure line 20. If, however, the error signal is greater than a positive threshold $E_s$, the valve 18 will exhaust or reduce the pressure in the pilot pressure line 20. In between the threshold values $-E_s$, $E_s$, the valve 18 will maintain the pressure in the pilot pressure line 20. The hysteresis shown in FIG. 2 is built into the valve 18 so that the valve 18 does not immediately respond to the change in pressure due to the filling or exhausting of the valve 18. This hysteresis also increases the life of the valve 18 because it is not rapidly switching states unnecessarily. Although the threshold values $-E_s$, $E_s$, are shown to be equal and opposite, any value from either of the thresholds may be suitable depending on the environment in which the booster regulator 12 is used.

Figure 3A:
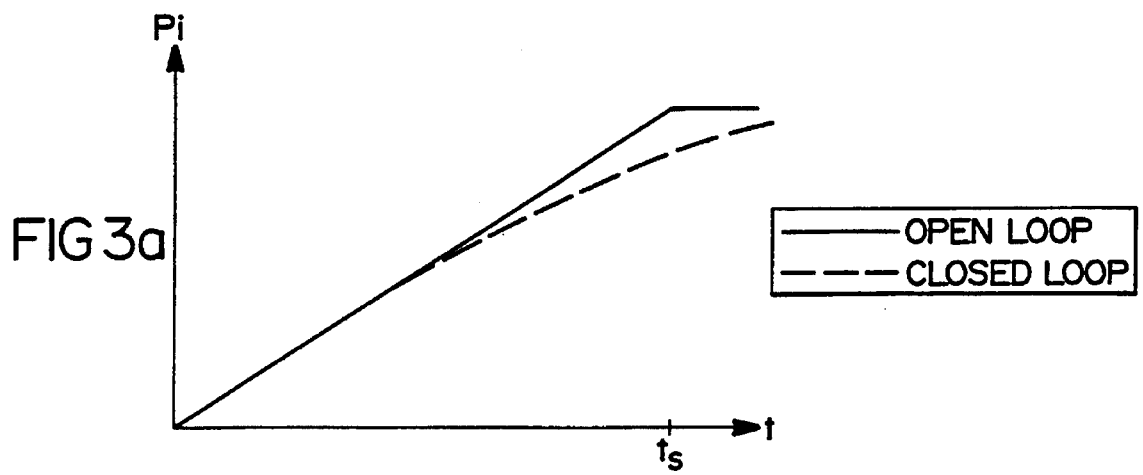
FIG. 3a is a graphic representation of the input pressure received by the transducer.
Figure 3B:
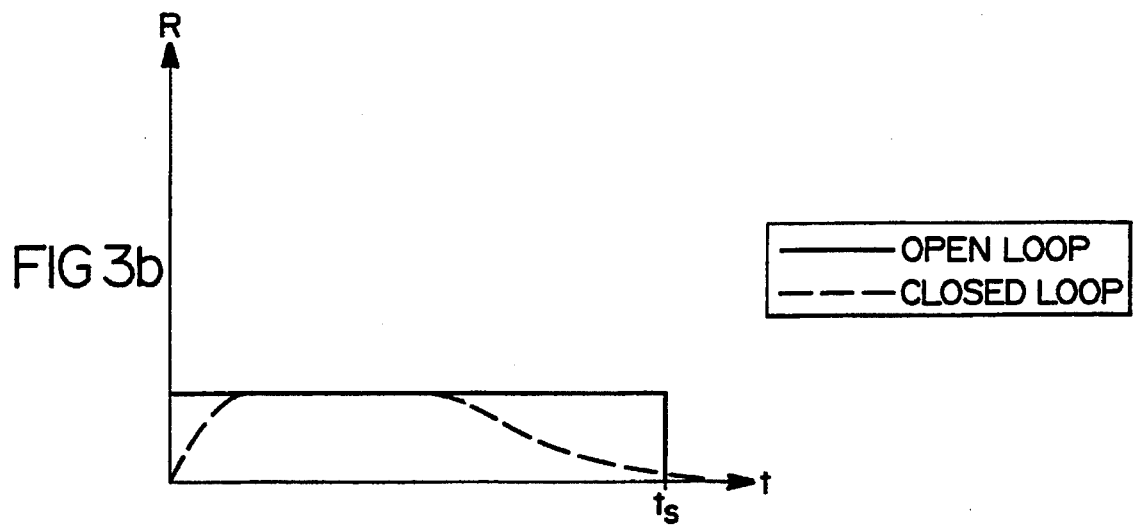

Turning to FIGS. 3a and 3b, the voltage signal and the rated feedback signal are respectively shown in open and closed loop conditions. The invention 10 operates in a closed loop. When the booster regulator 12 is opened to create an output pressure, the output pressure increases in a linear fashion. Therefore, the transducer 26 creates a voltage which ramps to a specific voltage corresponding to the desired output pressure put out by the booster regulator 12. For this example, the desired output pressure is reached at time $t_s$. The rated feedback signal is the first derivative of the voltage signal and can be seen to be a linear rate having a slope of zero which immediately drops to zero having a slope which closely approximates $-\infty$ at time $t_s$ when the voltage signal reaches a steady state.

Figure 4:
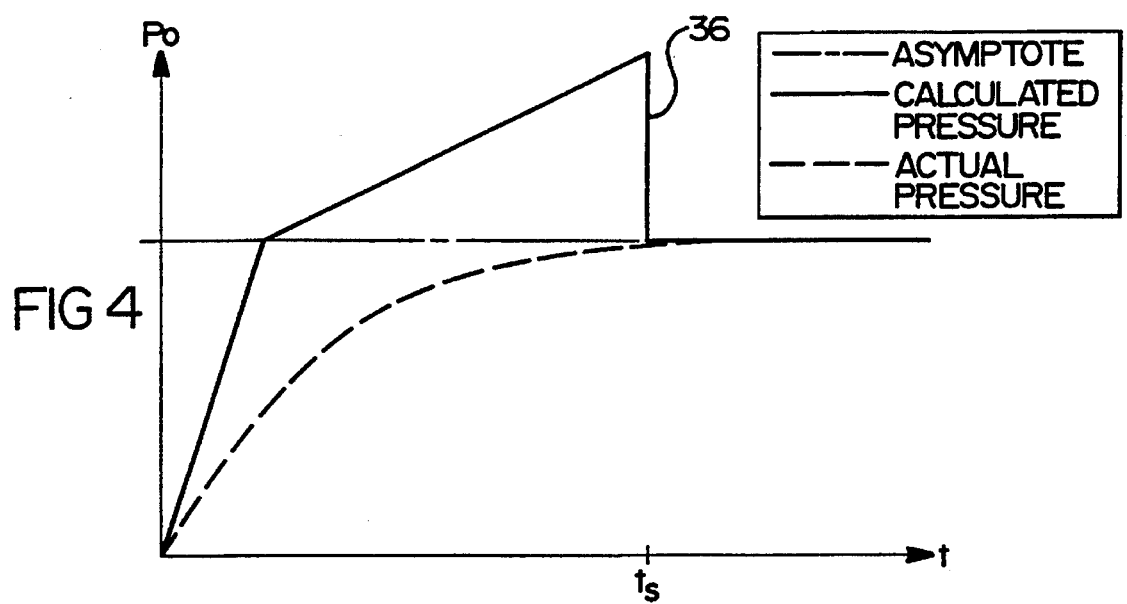
FIG. 4 is a graphic representation of the output pressure of the booster regulator.

Turning to FIG. 4, the calculated pressure is represented by a solid line which is the addition of the voltage signal and the rated feedback signal after they have been multiplied by their respective factors A, B. The actual pilot pressure is shown in a dashed line. The valve 18 responds to the error signal E(t) based on the calculated pressure and reduces the pressure of the pilot signal to the booster regulator 12 and immediately begins to reduce the output of the booster regulator 12. As the actual pressure output of the booster regulator 12 reaches the desired value, represented by the asymptote, the voltage signal responds by approaching the asymptotic limit without exceeding it. Once the plateau is reached, the rate of change of the voltage signal drops to zero, as represented at line 36 in FIG. 3B, eliminating the rated factor R(t) from the calculated pressure E(t). Thus, by incorporating or adding a second factor to the calculated pressure which is the first derivative of the voltage signal, the added factor immediately drops away leaving the valve 18 to maintain the booster regulator 12 in the proper position without having the booster regulator 12 overshoot its targeted output pressure resulting in a perfectly dampened system.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A pilot signal control assembly (10) for controlling an output pressure of a booster regulator (12) used to regulate the pressure of a fluid supply (14) at an output port (16), said pilot signal control assembly (10) comprising:

a valve (18) in fluid communication with the fluid supply (14) and the booster regulator (12), said valve (18) receiving fluid from the fluid supply (14) to produce a pilot pressure signal to control the booster regulator (12), said valve (18) further including an electrical port (22);

a feedback loop (24) in fluid communication with the output port (16) of the booster regulator (12) and said electrical port (22) of said valve (18), said feedback loop (24) including a transducer (26) in fluid communication with the output port (16), said transducer (26) transforming energy received from the output port (16) into a voltage signal, said pilot signal control assembly (10) characterized by said feedback loop (24) further including a signal subloop (30) electrically connected between said transducer (26) and said electrical port (22).

2. An assembly (10) as set forth in claim 1 further characterized by said signal subloop (30) including a rating circuit (32) receiving said voltage signal and producing a rated feedback signal.

3. An assembly (10) as set forth in claim 2 further characterized by an adding circuit (34) for adding said voltage signal and said rated feedback signal to create a feedback signal.

4. An assembly (10) as set forth in claim 3 further characterized by said rated feedback signal corresponding to a first derivative of said voltage signal.

5. A method for controlling an output pressure of a booster regulator (12) controlled by a valve (18) having a feedback loop (24) connected between an output port (16) of a booster regulator (12) and an input port (22) of a valve (18), the method comprising the steps of:

sending an error signal to the valve (18);

opening the valve (18) to create a pilot pressure based on the error signal E(t);

opening the booster regulator (12) based on the fluid received from the valve (18) to create an output flow defining an output pressure;

transforming energy from the output pressure into a voltage signal;

creating a rated feedback signal of the voltage signal;

adding the voltage signal to the rated feedback signal to create a combined feedback signal; and subtracting the feedback signal from a command signal to define the error signal.

6. A method as set forth in claim 5 further characterized by creating a rated feedback signal from a first derivative of the feedback voltage signal.

7. A method as set forth in claim 6 further characterized by multiplying the voltage signal by a proportional factor prior to the step of adding the voltage signal and the rated feedback signal.

8. A method as set forth in claim 7 further characterized by multiplying the rated feedback signal by a responsiveness factor prior to the step of adding the voltage signal and the rated feedback signal.

* * * * *